T. C. PAPADOPOULOS.
RESILIENT TIRE.
APPLICATION FILED JAN. 7, 1913.
1,106,238.
Patented Aug. 4, 1914.
2 SHEETS—SHEET 2.
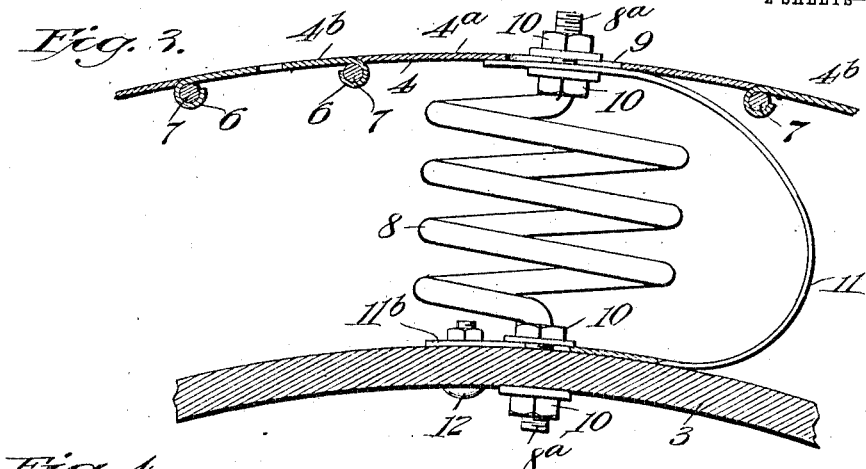
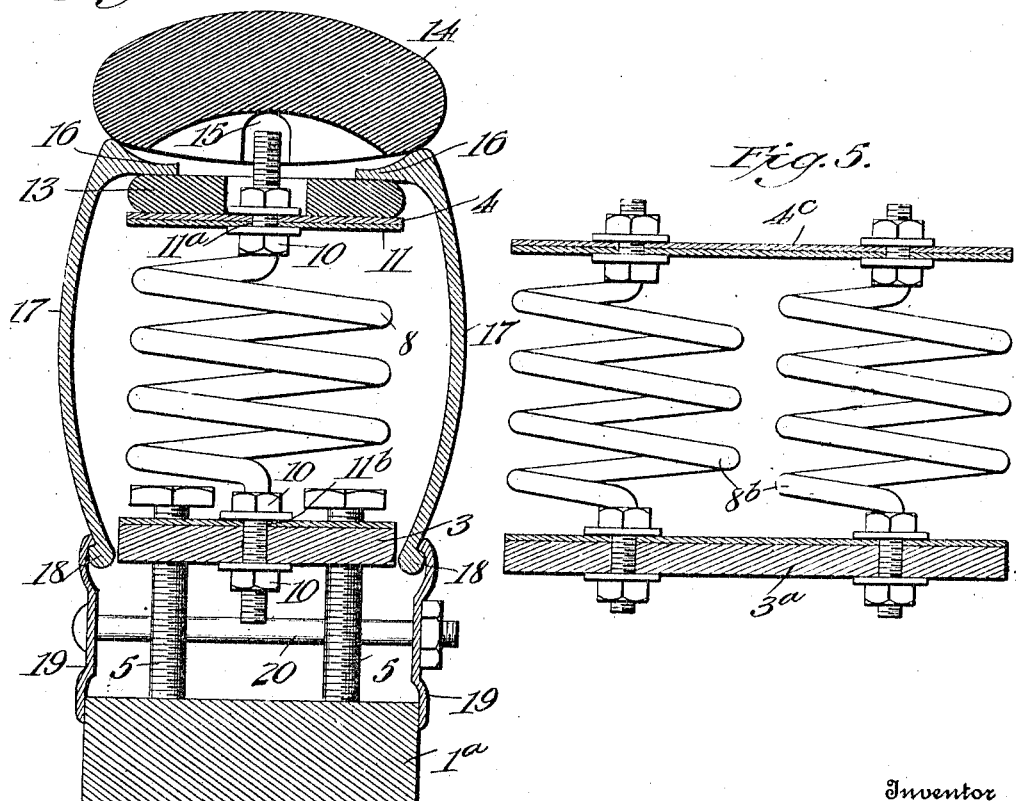
Inventor
Theodore Christos Papadopoulos
Witnesses
By Soteries Nicholson
Attorney

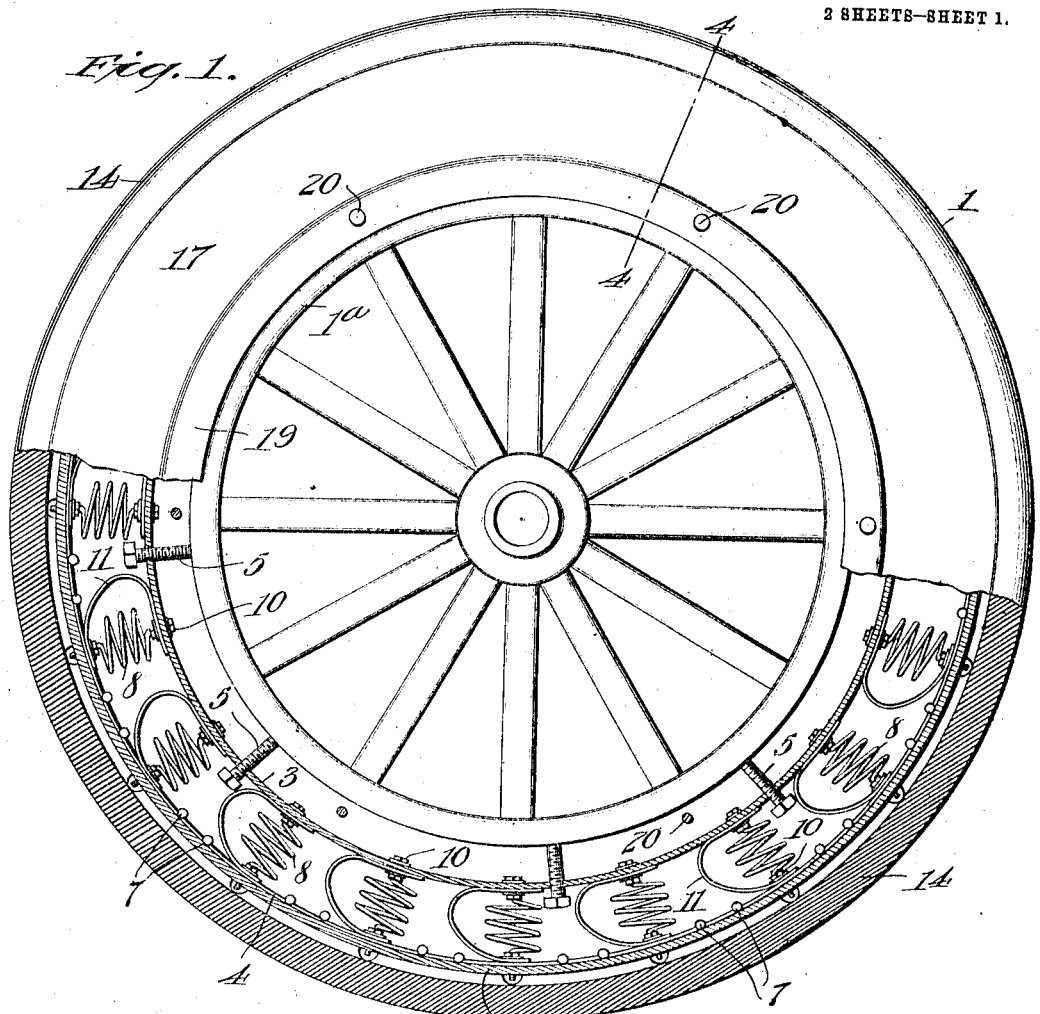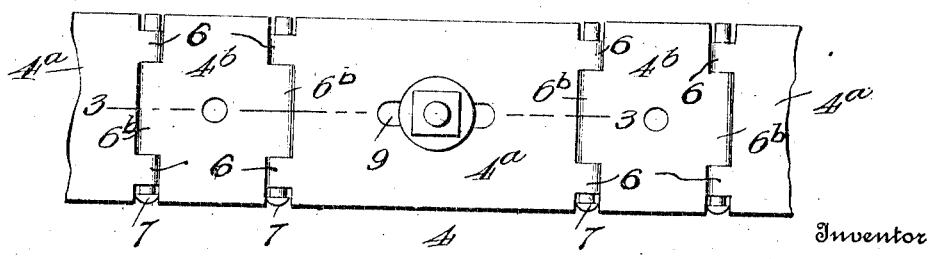

UNITED STATES PATENT OFFICE.

THEODORE CHRISTOS PAPADOPOULOS, OF DAYTON, OHIO.

RESILIENT TIRE.

1,106,238.  Specification of Letters Patent.  Patented Aug. 4, 1914.

Application filed January 7, 1913. Serial No. 740,637.

*To all whom it may concern:*

Be it known that I, THEODORE CHRISTOS PAPADOPOULOS, a subject of the King of Greece, residing at 1229 West Third street, Dayton, in the county of Montgomery and State of Ohio, have invented certain new and useful Improvements in Resilient Tires, of which the following is a specification.

The present invention relates to a spring tire for vehicle wheels, and has for its object to provide a device of this character which embodies novel features of construction whereby it will operate in an effective manner to absorb the sudden shocks and jars in substantially the same way as a pneumatic tire.

A further object of the invention is to provide a spring tire construction for vehicle wheels which can be readily mounted in position upon an ordinary wheel, which embodies few and durable parts adapted to be readily assembled or taken apart, and which is effectively housed so that it will not be rendered ineffective by accumulations of mud and dirt.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a wheel provided with a spring tire constructed in accordance with the invention, portions being broken away and shown in section to more clearly illustrate the invention. Fig. 2 is a top plan view of a portion of the outer rim. Fig. 3 is a vertical sectional view of the outer rim and supporting springs, taken on the line 3—3 of Fig. 2. Fig. 4 is an enlarged detail cross sectional view taken on the line 4—4 of Fig. 1, and Fig. 5 is a detail view showing a modification.

Corresponding and like parts are referred to in the following description and indicated in all the views of the drawings by the same reference characters.

Specifically describing the present embodiment of the invention, the numeral 1 designates a vehicle wheel which may be of any suitable construction and is formed with the usual felly $1^a$ upon which the spring rim is mounted. This spring tire includes an inner rim member 3 and an outer rim member 4 which is concentric with and spaced from the inner rim member 3. The inner rim member 3 is slightly larger than the felly 2 of the vehicle wheel and is adapted to be fitted upon the same and centered thereon in some suitable manner as by means of the centering screws 5.

The outer rim member 4 is composed of the hinged plates $4^a$ and $4^b$, the plates $4^a$ being shown as of a greater length than the plates $4^b$ and the various plates $4^a$ and $4^b$ being alternately disposed so that one of the short plates $4^b$ is interposed between each pair of the long plates $4^a$. The adjacent ends of the various plates $4^a$ and $4^b$ are formed with the tongues 6 and $6^b$ respectively which are returned upon themselves to provide bearing sleeves within which the pivot pins 7 are fitted. It will thus be obvious that the plates $4^a$ and $4^b$ of which the outer rim member 4 is built up are loosely jointed so as to swing freely about each other.

Interposed between each of the long plates $4^a$ of the outer rim member 4 and the inner rim member 3 is a radially disposed helical spring 8, the extremities of the said spring being extended axially of the spring and threaded as indicated at $8^a$. The inner end $8^a$ of each of the springs 8 passes through the rim member 3, while the outer end $8^a$ of each of the springs 8 passes loosely through a longitudinal slot 9 in the corresponding plate $4^a$, the two threaded ends $8^a$ of each of the springs being provided with the nuts 10 which serve to engage the members 3 and $4^a$ respectively to retain the various parts in proper relation to each other. The provision of the longitudinal slot 9 in each of the plates $4^a$ of the outer rim member 4 enables the outer end of each of the helical springs 8 to be readily adjusted in the required manner.

A bowed or U shaped spring 11 is employed in connection with each of the helical springs 8, the various springs 11 being all arranged in the plane of the wheel and disposed in such a manner as to receive the helical springs 8 between the end portions thereof. The outer arm of each of the U shaped springs 11 is formed with a suitable opening $11^a$ to receive the outer threaded end $8^a$ of the helical spring 8, while the opposite or inner arm of each of the U shaped springs 11 is formed with a longitudinal slot 11ᵇ to receive the inner threaded end 8ᵃ of the helical spring 8, this manner of constructing the U shaped springs being advantageous in that it tends to facilitate assembly of the parts. It will also be observed that the inner ends of the U shaped springs 11 are rigidly connected to the inner rim member 3 by suitable fastening members such as the bolts 12. These U shaped or bowed springs 11 serve to coöperate with the helical springs 8 to increase the resiliency of the construction and facilitate the absorption of all sudden shocks and jars.

The jointed outer rim member 4 is surrounded by a ring 13 of leather or other similar material, the said ring 13 being shown as formed with openings through which the ends 8ᵃ of the springs 8 pass. The annular tread member 14, which may be of any suitable material such as rubber, surrounds the leather ring 13, and is provided upon the inner face thereof with recessed portions 15 adapted to receive the projecting ends 8ᵃ of the helical springs. Clamped between the tread 14 and the ring 13 are flanged members 16 at the outer peripheries of flexible sides 17. These sides 17 may be formed of flexible and resilient metal and are provided at their inner peripheries with the annular lips or beads 18. Retaining rings 19 which are applied to opposite sides of the wheel serve to engage the felly 1ᵇ of the wheel and the said lips or beads 18 of the flexible sides 17. These retaining rings 19 are connected by transverse bolts 20 which are disposed between the felly 1ᵃ of the vehicle wheel and the inner rim member 3 of the spring rim.

The retaining rings 19 serve to limit the outward movement of the sides 17 relatively to the vehicle wheel, and said sides 17 provide a housing for excluding mud, dirt and other foreign matter from the interior spring members of the rim construction. Furthermore in connection with the side plates 17 and the clamping rings 19, it will be noted that the former have no supporting function at all but act as guiding flanges, and while flexibility is one of their characteristics enabling them to give in all directions, they may have a movement eccentric of the wheel axle within the grooves 19ᵃ of the clamping rings 19, as clearly illustrated in Fig. 4.

A slight modification is shown by Fig. 5, in which two of the helical spring members 8ᵇ are shown as arranged side by side and interposed between the inner rim member 3ᵃ and the outer rim member 4ᶜ. The various parts are substantially the same in construction as previously described, although they are made slightly wider in order to provide ample space for the two sets of springs 8ᵇ. Such a construction could be advantageously used in connection with heavy vehicles where a heavier and stronger construction would be necessary.

Having thus described the invention, what I claim as new and desire to secure by Letters Patent, is:—

1. A resilient tire for vehicle wheels including in combination with the felly, an inner rim member, an outer rim member composed of jointed sections, cushioning means between the two rim members, a continuous flexible ring surrounding the outer rim member, a tread surrounding the flexible ring, side cover members provided at their outer edges with inturned flanges which are interposed between the tread and the flexible ring, and retaining rings attached to the felly and provided with grooves which receive the inner edges of the flexible side plates and permit said inner edges to move outwardly and inwardly while limiting the outward movement thereof.

2. A resilient tire for vehicle wheels including in combination with the felly, a pair of normally concentric inner and outer rim members, adjustable means for holding one of said members spaced from the felly, springs having their ends fastened in the inner and outer rim members, a tread carried by the outer rim member, flexible side cover members provided at their outer edges with inturned flanges which are clamped between the tread and the outer rim member and formed at their inner edges with beads; and retaining rings applied to the opposite sides of the felly and provided with grooves which receive said beads and permit the same to move inwardly and outwardly while limiting the outward movement thereof.

In testimony whereof I affix my signature in presence of two witnesses.

THEODORE CHRISTOS PAPADOPOULOS.

Witnesses:
BERENICE H. BROY,
HELENE TRIEBLER.